(12) United States Patent
Baudry

(10) Patent No.: US 9,087,509 B2
(45) Date of Patent: Jul. 21, 2015

(54) METHOD OF SIMULTANEOUSLY TRANSFORMING A PLURALITY OF VOICE SIGNALS INPUT TO A COMMUNICATIONS SYSTEM

(71) Applicant: AIRBUS HELICOPTERS, Marignane, Cedex (FR)

(72) Inventor: Jean-Pierre Baudry, Toulon (FR)

(73) Assignee: Airbus Helicopters, Marignane Cedex (FR)

( * ) Notice: Subject to any disclaimer, the term of this patent is extended or adjusted under 35 U.S.C. 154(b) by 246 days.

(21) Appl. No.: 13/784,098

(22) Filed: Mar. 4, 2013

(65) Prior Publication Data

US 2013/0346071 A1    Dec. 26, 2013

(30) Foreign Application Priority Data

Mar. 28, 2012  (FR) ...................................... 12 00920

(51) Int. Cl.
*G10L 17/00* (2013.01)
*G10L 21/0364* (2013.01)
*G10L 21/057* (2013.01)

(52) U.S. Cl.
CPC ........... *G10L 17/005* (2013.01); *G10L 21/0364* (2013.01); *G10L 21/057* (2013.01)

(58) Field of Classification Search
USPC ........................................................ 704/208
See application file for complete search history.

(56) References Cited

U.S. PATENT DOCUMENTS 5,438,623 A    8/1995   Begault
2002/0111796 A1    8/2002   Nemoto
(Continued)

FOREIGN PATENT DOCUMENTS

EP    2138009 A1    12/2009
WO    2008128054 A1    10/2008

OTHER PUBLICATIONS

Monitoring the Simultaneous Presentation of Spatialized Speech Signals in a Virtual Acoustic Environment; W. Todd Nelson, Robert S. Bolia, Mark A, Ericson and Richard McKinley. Defense Technical Information Center OAI-PMH Repository (United States) Jun. 1, 1998. XP055045550. URL:http://www.dtic.mil/cgi-bin/GETTRD03?Location=U2&doc=GetTRDoc.pdf&ADA430284.
(Continued)

*Primary Examiner* — Qian Yang
(74) *Attorney, Agent, or Firm* — Brooks Kushman P.C.

(57) ABSTRACT

A method of simultaneously transforming at least two input voice signals $x_i$ of a communications system (30), each input voice signal $x_i$ being received at a specific reception frequency $F_i$ and corresponding to the voice of a remote party communicating with a user of the communications system (30). During an initialization stage, a transformation $T_i$ is allocated to at least one reception frequency $F_i$ of the input voice signals $x_i$, and during a utilization stage, transformations $T_i$ are applied simultaneously to the input voice signals $x_i$ as a function of the reception frequencies $F_i$, modifying at least one characteristic of each of the input voice signals $x_i$. Thus, the voice of each remote party in communication with the user of the communications system (30) is modified artificially by a transformation $T_i$, thereby making it easier for the user to perceive and discriminate between simultaneous voices from the remote parties.

16 Claims, 1 Drawing Sheet

(56) References Cited

U.S. PATENT DOCUMENTS

| | | | |
|---|---|---|---|
| 2006/0247922 A1* | 11/2006 | Hetherington et al. ....... | 704/208 |
| 2007/0027679 A1* | 2/2007 | Mansour ....................... | 704/203 |
| 2008/0004882 A1* | 1/2008 | Papadimitriou et al. ...... | 704/275 |
| 2008/0208577 A1* | 8/2008 | Jeong et al. ................... | 704/231 |
| 2008/0254753 A1 | 10/2008 | Steenstra | |
| 2011/0112830 A1* | 5/2011 | Adibi ............................ | 704/211 |
| 2012/0029301 A1* | 2/2012 | Battista, Jr. ................... | 600/300 |

OTHER PUBLICATIONS

A Review of the Cocktail Party Effect; Barry Arons, MIT Media Lab; Journal of the American Voice I/O Society, vol. 12; Jan. 1, 1992. Sections: The separation of Speech Channels. Responding to One of Two Simultaneous Messages, Speech Scene Analysis, Strean Segregation Syntheisis, Application Areas.

Aesthetic and Auditory Enhancement for Multi-Stream Information Sonification; Hong Jun Song et al. Proceedings on the 3rd International Conference on Digital Interactive Media in Entertainment and Arts; Jan. 1, 2008, pp. 224-231, Section 4.2; XP055045547.

Design Considerations for Improving the Effectiveness of Multitalker Speech Displays; Douglas Brungart and Brian Simpson. Proceedings of the 2002 International Conference on Auditory Display; Jul. 2, 2002, Sections 5 and 6; XP055045537.

Search Report and Written Opinion; Application No. FR1200920; dated: Nov. 27, 2012.

* cited by examiner

METHOD OF SIMULTANEOUSLY TRANSFORMING A PLURALITY OF VOICE SIGNALS INPUT TO A COMMUNICATIONS SYSTEM

CROSS REFERENCE TO RELATED APPLICATIONS

This application claims priority to French patent application No. FR 12 00920 filed on Mar. 28, 2012, the disclosure of which is incorporated in its entirety by reference herein.

BACKGROUND OF THE INVENTION (1) Field of the Invention

The present invention lies in the field of communications systems. It relates to a method of simultaneously transforming voice signals input to a communications system. The method is intended more particularly for the communications systems present in aircraft.

(2) Description of Related Art

At present, in the field of aviation in general, and in the field of rotary wing aircraft more particularly, a pilot uses the communications system of the aircraft to dialog with multiple remote parties, whether outside the aircraft or indeed on board the aircraft.

The pilot needs to communicate with air traffic controllers in various control towers controlling and organizing the traffic of aircraft, and also with the pilot of other aircraft or indeed with remote parties on the ground, on board a ship, or on board an oil platform, for example.

The communications system of an aircraft can receive a plurality of voice signals, each voice signal being made up of waves that are received at a given reception frequency. Each received voice signal is then transmitted to the pilot by the communications system in the form of the voice of the remote party. The term "input voice signal" is used to mean a signal received by the communications system and corresponding to the voice of a remote party in communication with the pilot.

For example, high frequency (HF), very high frequency (VHF), or indeed ultra-high frequency (UHF) systems are known for performing such communication.

In order to undertake this type of communication, the pilot makes use of appropriate adjustment means on the communications system to define one or more reception frequencies. Each reception frequency corresponds to the frequency of the waves making up each voice signal corresponding to the voices of the remote parties in communication with the pilot.

Below in the present description, the term "reception frequency of the signal" is used more simply to designate the frequency of the waves making up the received signal.

The pilot also communicates with people on board the aircraft, such as a copilot, a navigator, or any other person on board the aircraft. The communications system making this possible is sometimes referred to as an "on-board telephone".

Nowadays, the communications systems present on aircraft enable signals to be received simultaneously on a plurality of reception frequencies, thus making it possible to communicate simultaneously with a plurality of remote parties such as a traffic controller, or the pilot of another aircraft. In addition, the people on board the aircraft use the same communications system, via the on-board telephone to communicate with one another and with the pilot of the aircraft.

A problem then arises when several remote parties, whether external to the aircraft or on board it, speak simultaneously to the pilot. Since the voices of the remote parties are then superposed, their intelligibility is reduced significantly, and understanding messages becomes more complicated.

Furthermore, when the pilot is already in communication with one remote party, another message received on another reception frequency can be difficult to understand or even inaudible. That other message might be important, e.g. coming from a traffic controller requesting the pilot of the aircraft to change course, and the message might be misunderstood or not understood at all, and therefore not taken into account by the pilot of the aircraft.

In order to mitigate such problems with present communications systems, the pilot of an aircraft can manually increase the sound volume associated with the reception frequency for a signal that corresponds to the poorly understood message. Conversely, the pilot can lower the sound volume associated with the reception frequency corresponding to messages that are considered as not having priority.

Either way, the pilot temporarily lets go of the flight controls in order to modify the sound volume associated with the reception frequency(ies) of the corresponding signal(s), and that might be dangerous, depending on flying conditions. Furthermore, during the time it takes to change sound volume, some or all of the messages might be poorly understood or even not understood at all by the pilot. This can be dangerous, depending on the importance of the message, particularly if the pilot needs to perform a maneuver or to take action very quickly.

Finally, the pilot may ask the remote party to repeat the message that has not been understood or that has been poorly understood. Once again, that can be dangerous if it is necessary for the pilot to maneuver or to take action very quickly.

Under all circumstances, pilot reactivity is degraded by the received message being poorly understood or not understood at all, and the loss of time this causes can be dangerous if the message is particularly important and rapid reaction is needed.

Nevertheless, if the aircraft has a system for spatializing communications, understanding various superposed messages can be made easier. For example, according to document U.S. Pat. No. 5,438,623, such a system makes it possible to transmit the received messages so as to give the impression that they come from different sources placed in different locations in the space around the pilot. However, there is no priority amongst the various messages depending on the remote party, e.g. a traffic controller. There is no transformation of the signal, but merely a shift in the time the message is perceived, thereby giving the impression of the source of the corresponding voice being shifted in three-dimensional space.

Nevertheless, as from about three or four simultaneous messages, the pilot once more perceives voices that are superposed and very difficult to understand, since the spatialization is no longer sufficient for improving the situation.

There also exists systems for mitigating poor hearing of a user. Such systems, e.g. described in documents EP 2 138 009 and US 2002/0111796, serve to modify the characteristics of a voice so as to make it easier to understand by a user having a hearing defect. The characteristics of the voice that are modified include sound volume and one or more frequencies of the voice.

A voice may be resolved into a plurality of tones, each tone being characterized in particular by its frequency. For example, a tone with a low frequency corresponds to a low-pitch tone and a tone with a high frequency corresponds to a high-pitch tone.

By increasing the frequency of one or more tones making up the voice, it is possible to make it higher pitched, and consequently more distinctive for certain people.

However, the systems described modify one voice only and they are not capable of processing a plurality of voices simultaneously.

Elsewhere, the document "Design considerations for improving the effectiveness of multitalker speech displays", from the Proceedings of the 2002 International Conference on Auditory Display, Kyoto, JP, of Jul. 2, 2002, describes various characteristics that contribute to the intelligibility or lack of intelligibility associated with superposed voices during multitalker communications, which characteristics may be background sounds, the number of talkers, whether or not a talker is known, the characteristics that are intrinsic to each voice, the sound level of each voice, or indeed the spatial position of each voice. That document also mentions that it is possible to modify one or more characteristics of a voice in order to improve its intelligibility, but nevertheless, it does not disclose how those characteristics are to be modified.

The technological background also contains the documents "A review of the cocktail party effect" from Journal of the American Voice I/O Society, 1992, Vol. 12, pp. 35-50, "Aesthetic and auditory enhancements for multi-stream information sonification" from Proceedings of the 3rd International Conference on Digital Interactive Media Entertainment and Arts, 2008, pp. 224-231, and "Monitoring the simultaneous presentation of spatialized speech signals in a virtual acoustic environment" from Defense Technical Information Center OAI-PMH Repository, US, Jun. 1, 1998, and also document U.S. Pat. No. 5,438,623.

In the description below, the term "frequency of the voice" is used to designate simply the frequencies of the tones making up the voice. These voice frequencies are completely distinct and independent from the frequency on which the signal corresponding to the voice is received.

BRIEF SUMMARY OF THE INVENTION

The present invention thus seeks to propose a method that makes it possible to overcome the above-mentioned limitations.

According to the invention, a method of transforming at least two voice signals input to a communications system comprises an initialization stage and a utilization stage. Each input voice signal is received at a specific reception frequency and corresponds to the voice of a remote party communicating with a user of the communications system.

During the initialization stage, at least two transformations are applied to the input voice signals, each transformation being associated with at least one reception frequency of the input voice signals and being distinct from the other transformations. Thereafter, during the utilization stage, these transformations are applied simultaneously to the input voice signals as a function of their reception frequencies. Once transformed, the voice signals are directed to an output of the communications system, e.g. for delivery to a headset of the user of the system.

The method is remarkable in that it makes it possible, during the utilization stage, for a user of the communications system to optimize the perception of the voices of remote parties, which voices correspond to input voice signals that are received simultaneously.

The transformations make it possible to modify at least one characteristic of each input voice signal, and consequently at least one characteristic of the voice of each of the remote parties communicating with the user of the communications system. Modifiable characteristics of a voice include in particular its sound volume and the frequencies of the voice.

The voice of each remote party communicating with the user of the communications system is modified artificially by the or each transformation applied thereto, thereby making the voices easier to perceive by the user of the system and consequently enabling them to be discriminated and understood.

For example, the sound volume of a first voice, corresponding to a first input voice signal having a first reception frequency may be increased, while a second voice, corresponding to a second input voice signal having a second reception frequency may be modified so as to be higher pitched. A third voice may be modified to be made to sound metallic.

These transformations thus make it possible to avoid the superposition that occurs when voices are received simultaneously making them impossible to understand, in particular by making it easier to discriminate between them.

A high pitched voice that is simultaneous with a low pitched voice can be distinguished more easily than two high pitched voices. Similarly, a voice that is made to sound metallic can be distinguished from the other two voices. This enables the user of the communications system to distinguish between, and consequently to understand, the voices of the various remote parties that correspond to the voice signals received by the communications system.

Furthermore, each voice of a remote party corresponds to an input voice signal received at a specific reception frequency. By associating each transformation with at least one reception frequency for these input voice signals, it is possible to allocate a single transformation to each input voice signal and consequently to each voice of a remote party communicating with the user of the communications system.

Furthermore, by associating a transformation with a reception frequency for an input voice signal, and consequently with a voice of a particular remote party, the user is capable of giving priority to certain messages. By allocating a specific transformation to a signal coming from a remote party likely to be delivering an important message, the user will immediately recognize the transformation on hearing the voice and can concentrate on that message that might be important. For example, the pilot of an aircraft may allocate an increase in sound volume to a message coming from a traffic controller.

The method may also include one or more additional characteristics.

The voices of the remote parties communicating with the user of the communications system are generally received by the communications system in the form of input analog signals. An analog signal is a signal having a value that varies continuously. The method of the invention then enables transformations to be applied to these input analog signals in order to modify at least one characteristic of the voice of each remote party communicating with a user of the communications system.

Nevertheless, it can be advantageous to transform the input analog signals into digital signals. A digital signal is made up of a succession of discontinuous values, derived from the analog signal. The digital signal is easier to modify than is an analog signal, with various transformations being applied to the successive values making it up.

In the method of the invention, the input analog signals are therefore converted into digital signals by means of at least one analog-to-digital converter. Thereafter, the transformations are applied to the digital signals in order to obtain transformed digital signals. The transformed digital signals are then converted into transformed analog signals by means of a digital-to-analog converter. These transformed analog signals correspond to the modified voices of the remote parties, thus enabling the user of the communications system to distinguish between them more easily.

In a preferred implementation of the invention, the analog-to-digital converter and the digital-to-analog converter are constituted by a single converter capable of performing both conversions. For example, the converter may be a codec. The word "codec" is a portmanteau word, i.e. a neologism formed by melding together a portion of each of at least two existing words, such that "codec" in fact means "coder-decoder". A codec is thus capable of coding a first signal, e.g. converting an analog signal into a digital signal, and also of decoding a second signal, e.g. converting a digital signal into an analog signal. By way of example, such a codec may be incorporated in a printed circuit or indeed in software that is incorporated in the communications system.

In an implementation of the invention, the initializing stage of the transformation method, during which a transformation is allocated to each voice input signal reception frequency, may itself be subdivided into a plurality of steps.

Firstly, the reception frequencies of the input voice signals that might be received by the communications system are input. This inputting is performed via input means, that may be incorporated in the communications system or that may be suitable for being connected thereto. For this purpose, it is possible to select these reception frequencies from a list of reception frequencies stored in storage means, or else to input the desired reception frequency values directly. The storage means may be incorporated in the communications system or they may be suitable for being connected thereto.

Thereafter, the transformations are defined, each transformation being allocated to at least one of the previously input reception frequencies and each reception frequency being associated with a single transformation. During the utilization stage, each transformation is applied to each input voice signal corresponding to the reception frequency(ies) associated with the transformation in question.

In order to define these transformations, each transformation is selected from a list of transformations stored in the storage means of the communications system. Thereafter, if necessary, it is possible to adjust the transformation by dedicated adjustment means in order to adapt it to each user of the communications system, thereby improving the differences between the voices modified by the transformation relative to the other transformed voices. Sensitivity to various different tones can vary from one user to another. It is therefore advantageous to be able to adjust each transformation so as to adapt it to the sensitivity of the user.

For example, it is possible to modify the sound volume or one or more frequencies of the voice corresponding to the input voice signal concerned by the transformation. The dedicated adjustment means may be incorporated in the communications system or they may be suitable for being connected thereto.

Finally, these reception frequencies and the associated transformations are stored in a dedicated database. This database is stored in the storage means.

This step thus makes it possible to define all of the reception frequencies corresponding to the input voice signals that are to be received by the communications system, and also the set of transformations that are associated with these input voice signals.

In a first implementation of the method, at least one transformation is constituted by a digital filter. The transformed digital signal as obtained in this way is in compliance with the equation:

$$y_i(n) = \prod_{k=0}^{k=n-1} a_{ik} \cdot y_i(n-k) + \sum_{k=0}^{k=n-1} b_{ik} \cdot x_i(n-k)$$

where $x_i(n)$ is the input digital signal and $y_i(n)$ is the transformed digital signal. i and n are integers, with i corresponding to the number of the input voice signal $x_i$, and n corresponding to the rank of a value of the digital signal in the succession of discontinuous values making up the digital signal. The coefficients $a_{ik}$ and $b_{ik}$ are defined so as to modify at least one characteristic of the voice corresponding to the input voice signal and these coefficients are specific to each transformation $T_i$.

For example, at least one transformation is constituted by a digital filter of finite impulse response. The transformed digital signal as obtained in this way is in compliance with the equation:

$$y_i(n)=x_i(n)+\alpha \cdot x_i(n-K)$$

The coefficients $\alpha$ and K are defined so as to modify at least one characteristic of the voice corresponding to the input voice signal, K being an integer.

In another example, at least one transformation is constituted by a digital filter of infinite impulse response. The transformed digital signal as obtained in this way is in compliance with the equation:

$$y_i(n)=x_i(n)+\alpha \cdot y_i(n-K)$$

The coefficients $\alpha$ and K are defined so as to modify at least one characteristic of the voice corresponding to the input voice signal, K being an integer.

In a second implementation of the method, at least one transformation is constituted by a processor module enabling the input voice signal to be modified in compliance with a known principle generally referred to as "pitch shifting". The purpose of this transformation is to modify at least one tone making up the voice of the remote party by at least one octave without changing the duration of the tone.

When a tone is shifted by one octave upwards, i.e. so as to obtain a tone that is higher pitched, the duration of the tone is normally shortened, being divided by two. In contrast, pitch shifting makes it possible to play back a tone that is different by one octave but without modifying its duration. Such a transformation is easier to implement on a digital signal than on an analog signal. The voice corresponding to the input signal is thus easier to distinguish from other voices.

In a third implementation of the method, at least one transformation is constituted by a processor module also known as a "vocoder", which is a contraction of the term "voice coder". A vocoder is a method of processing a sound signal that enables the main spectral components of a voice to be analyzed and that enables a synthetic voice to be fabricated on the basis of the result of that analysis and in accordance with the characteristics of a carrier signal associated with the processor module and defining the transformation.

By way of example, certain vocoders enable the frequencies of a voice to be offset, such that the voice becomes completely deformed and unrecognizable, while still remaining perfectly comprehensible. That technique is used in particular for making a speaker anonymous.

Each of these transformations enables a signal-to-noise ratio to be preserved together with properties that guarantee the intelligibility of voices that are received simultaneously.

The present invention also provides a communications system. Such a communications system comprises at least one receiver means suitable for receiving a plurality of input voice signals, each input voice signal being received at a specific reception frequency. Such a system also has at least one transmitter means for transmitting voice output signals to other parties and at least one processor unit together with at least one storage means.

The processor unit of the communications system includes calculation means that executes instructions stored within the storage means in order to transform each input voice signal as a function of its reception frequency so as to enable a user of the communications system to optimize perception of the voices of the remote parties corresponding to input voice signals that have been received simultaneously.

In an embodiment of the system of the invention, the communications system includes at least one input means for inputting the reception frequencies and for selecting the transformations from a list of transformations stored in the storage means. Thereafter, the communications system makes it possible to allocate each transformation to at least one of the reception frequencies that have been input. Finally, these reception frequencies and the associated transformations are stored in the storage means.

In an embodiment of the invention, the communications system includes at least one adjustment means for adjusting the transformations. The transformed voice can thus be adapted to each user of the communications system, thereby improving the differences between the voices modified by the transformation relative to the other transformed voices.

In an other embodiment of the invention, the communications system includes at least one analog-to-digital converter for converting the input voice signals into digital signals prior to applying the associated transformations thereto. The communications system also includes at least one digital-to-analog converter for converting the digital signals as transformed by the transformation into transformed analog voice signals. The analog-to-digital converter and the digital-to-analog converter may be constituted by the same converter, e.g. a codec, so as to simplify the system.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

Elements that are present in more than one of the figures are given the same references in each of them.

DETAILED DESCRIPTION OF THE INVENTION

Figure 1:
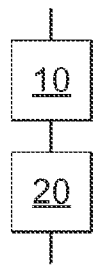
FIG. 1 is a block diagram of the method of the invention.

FIG. 1 is a block diagram of the transformation method of the invention, comprising two steps: an initialization stage 10 and a utilization stage 20.

Figure 2:
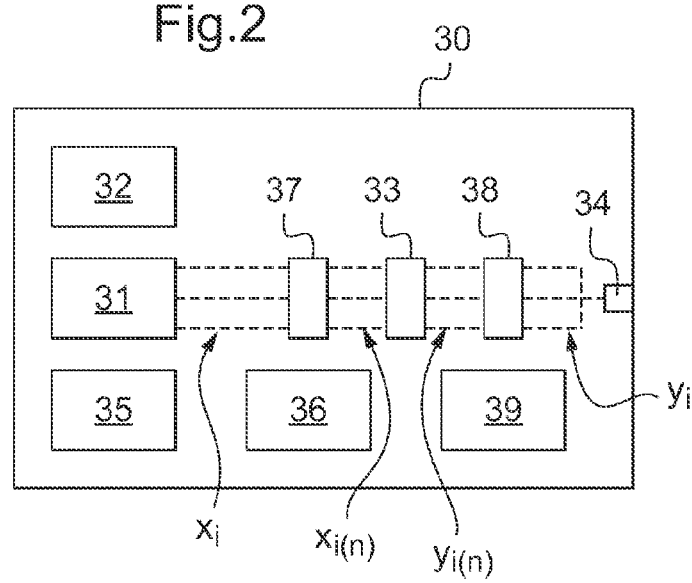
FIG. 2 shows a communications system of the invention.

FIG. 2 shows a communications system comprising receiver means 31, transmitter means 32, and a processor unit 33.

The receiver means 31 are suitable for receiving a plurality of input voice signals $x_i$, each input signal $x_i$ being received at a specific reception frequency $F_i$ and corresponding to the voice of a party in communication with a user of the communications system 30.

The communications system 30 also has storage means 35, input means 36, and adjustment means 39.

In the method of the invention, during the initialization stage 10, at least two transformations $T_i$ are applied to the input voice signals, each transformation $T_i$ being associated with at least one reception frequency $F_i$ and being distinct from the other transformations.

Then, during the utilization stage 20, these transformations $T_i$ are applied simultaneously to the input voice signals $x_i$ of corresponding reception frequencies $F_i$, thereby transforming each input voice signal $x_i$ so as to optimize reception of the voice of that party by the user.

For this purpose, the processor unit 33 of the communications system 30 has calculation means executing instructions stored within the storage means 35 for transforming each input voice signal $x_i$. Thereafter, each transformed voice signal $y_i$ is directed to an output 34 of the communications system 30, e.g. in order to be delivered to a headset of a user of the communications system 30.

The voice of the other party is thus artificially modified, by modifying at least one of the characteristics of that voice, such as its sound volume or its frequency.

During this initialization stage 10, said reception frequencies $F_i$ of the input voice signals $x_i$ are input via the input means 36, and then the transformation $T_i$ to be applied to each reception frequency $F_i$ is selected from a list of transformations stored in the storage means 35. i is an integer and corresponds to a number of the input voice signal $x_i$.

Thereafter, these reception frequencies $F_i$ and the associated transformations $T_i$ are stored in a dedicated database within the storage means 35.

It is also possible to adjust the transformation $T_i$ using the adjustment means 39. This makes it possible in particular to adapt the transformation $T_i$ to each user so as to optimize the distinctions between voices that are received and transformed simultaneously.

During the utilization stage 20, it is possible to apply to each input voice signal $x_i$ the transformation $T_i$ associated with the reception frequency $F_i$ of the input voice signal $x_i$, thereby obtaining a transformed voice signal $y_i$.

Figure 3:
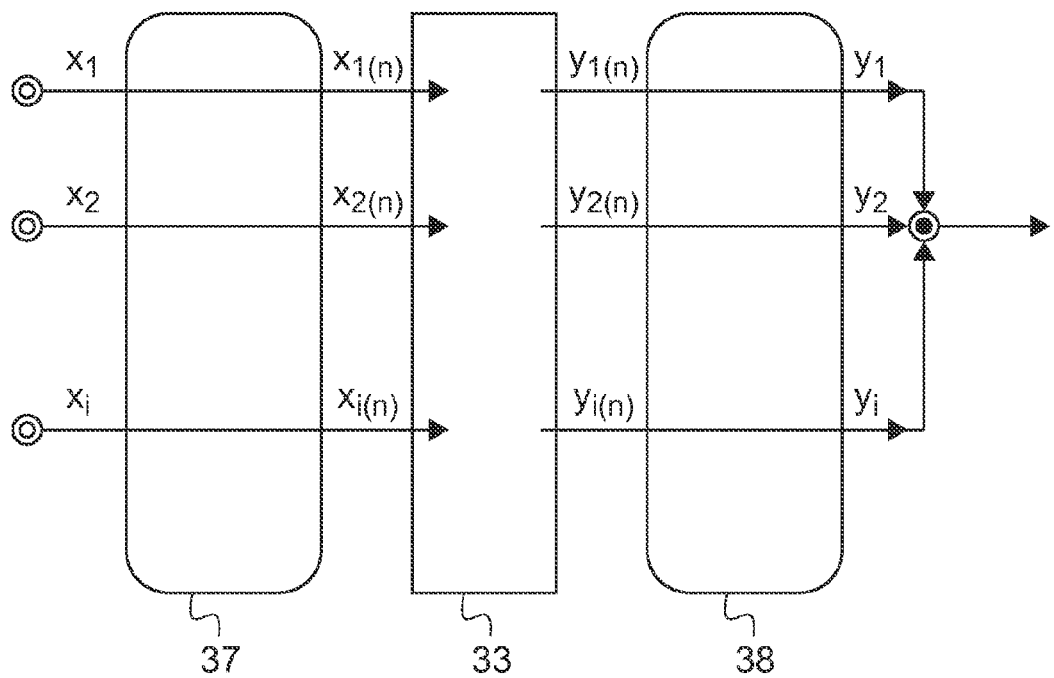
FIG. 3 shows a principle for transforming input voice signals.

During the utilization stage 20, it is then preferable for each transformation to be applied to a digital signal $x_i(n)$. FIG. 3 shows analog-to-digital converters 37 and digital-to-analog converters 38 present in the communications system 30. For this purpose, the analog-to-digital converter 37 is used to convert the input voice signals $x_i$ into digital signals $x_i(n)$, where n is an integer corresponding to the rank of a value in the digital signal sequence selected from the succession of discontinuous values making up the digital signal.

Thereafter, the transformation $T_i$ associated with the reception frequency $F_i$ of the input voice signal $x_i$ is applied to each digital signal $x_i(n)$ by means of a processor unit 33, thereby obtaining the transformed digital signal $y_i(n)$.

Finally, these transformed digital signals $y_i(n)$ are converted into transformed analog voice signals $y_i$ by a digital-to-analog converter 38 present in the communications system 30.

In a preferred embodiment of the invention, the analog-to-digital converter 37 is constituted by a codec, and the digital-to-analog converter 38 is also constituted by the same codec.

A digital signal is made up of a succession of discontinuous values, while an analog signal is made up of a value that varies continuously. It is easier to apply transformations to discontinuous values, i.e. to a digital signal, than to a continuous value, i.e. to an analog signal.

Nevertheless, in a variant of the invention, each transformation may be applied to analog signals, however, the performance is diminished.

The transformations $T_i$ applicable to the digital signal $x_i(n)$ may be constituted by a digital filter enabling a transformed digital signal $y_i(n)$ to be obtained in application of the equation:

$$y_i(n) = \sum_{k=0}^{k=n-1} a_{ik} \cdot y_i(n-k) + \sum_{k=0}^{k=n-1} b_{ik} \cdot x_i(n-k)$$

where i is an integer corresponding to the number of the input voice signal $x_i$, and n is an integer corresponding to the rank of the value of the digital signal in the succession of discontinuous values making up the digital signal, and where the coefficients $a_{ik}$ and $b_{ik}$ are specific to each transformation $T_i$ and are defined in order to modify at least one of said characteristics of said voice of said other party.

For example, a transformation $T_i$ may be a digital filter of finite impulse response serving to obtain a transformed digital signal $y_i(n)$ in application of the equation:

$$y_i(n) = x_i(n) + \alpha \cdot x_i(n-K)$$

where $\alpha$ and K are defined so as to modify at least one of said characteristics of said voice of said other party, K being an integer.

Likewise, a transformation $T_i$ may be constituted by a digital filter of infinite impulse response enabling a transformed digital signal $y_i(n)$ to be obtained in application of the equation:

$$y_i(n) = x_i(n) + \alpha \cdot y_i(n-K)$$

where $\alpha$ and K are defined in order to modify at least one of said characteristics of said voice of said other party, K being an integer.

In an embodiment of the invention, a transformation $T_i$ may be constituted by a processor module serving to modify at least one tone of said voice by at least one octave without modifying the duration of that tone.

In another embodiment of the invention, a transformation $T_i$ may be constituted by a processor module serving to analyze at least one spectral component of said voice and to fabricate a synthetic voice from the result of that analysis and in application of characteristics of a carrier signal associated with that processor module.

Each of the transformations serve to preserve a signal-to-noise ratio and properties that guarantee the intelligibility of voices received simultaneously.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of simultaneously transforming at least two voice signals $x_i$ input to a communications system, each input voice signal $x_i$ being received by the communications system at a specific reception frequency $F_i$ and corresponding to a voice of a remote party in communication with a user of said communications system, the reception frequency of each input voice signal $x_i$ being distinct and independent of voice frequencies of the voice of the remote party corresponding to the input voice signal, i being an integer corresponding to a number of said input voice signal $x_i$ in which method:

during an initialization stage, transformations $T_i$ are allocated to said reception frequencies $F_i$ of said input voice signals, each transformation $T_i$ being associated with a respective one of the reception frequencies $F_i$ of said input voice signals $x_i$ and being distinct from the other transformations in modifying voice characteristics;

during a utilization stage, said transformations $T_i$ are applied simultaneously to said input voice signals $x_i$ as a function of the reception frequencies $F_i$ of the input voice signals $x_i$, thereby transforming each input voice signal $x_i$ with the transformation $T_i$ associated with the reception frequency $F_i$ of the input voice signal $x_i$ so as to modify voice characteristics of the voices of the remote parties corresponding to the input voice signals $x_i$ including modifying a sound volume of the voice of a first one of the remote parties and modifying the voice frequencies of the voice of a second one of the remote parties in order to optimize the perception and the discrimination of said voices by said user and thereby allow said user to concentrate on the voice of the remote party likely to deliver an important message.

2. The method of claim 1 wherein:

each input voice signal $x_i$ is transformed with the transformation $T_i$ associated with the reception frequency $F_i$ of the input voice signal $x_i$ so as to modify voice characteristics of the voices of the remote parties corresponding to the input voice signals $x_i$ further including modifying the voice of a third one of the remote parties to sound metallic.

3. A method according to claim 1, wherein, during said initialization stage:

each reception frequency Fi for said input voice signals xi is input via input means;

each transformation Ti allocated to at least one reception frequency Fi is defined; and said reception frequencies Fi and said associated transformations Ti are stored in a dedicated database within storage means.

4. A method according to claim 3, wherein during said initialization stage, in order to define each transformation $T_i$:

said transformation $T_i$ is selected from a list of transformations stored in said storage means; and said transformation $T_i$ is adjusted by using dedicated adjustment means.

5. A method according to claim 1, wherein during said utilization stage, said transformation Ti associated with said reception frequency Fi of an input voice signal xi is applied to each input voice signal xi so as to obtain a transformed voice signal yi.

6. A method according to claim 5, wherein at least one transformation $T_i$, may be constituted by a processor module enabling at least one tone of said voice to be modified by at least one octave without modifying the duration of the tone.

7. A method according to claim 1, wherein during said utilization stage:

said analog input voice signals xi are converted into digital signals xi(n), each made up of a succession of discontinuous values, by means of an analog-to-digital converter, where n is an integer corresponding to the rank of a value of said digital signal xi in said succession of discontinuous values;

said transformation Ti associated with said reception frequency Fi of said input voice signal xi is applied to each digital signal xi(n) by means of a processor unit, thereby obtaining a transformed digital signal yi(n); and said transformed digital signals yi(n) are converted into transformed analog voice signals yi by means of a digital-to-analog converter.

8. A method according to claim 7, wherein said analog-to-digital converter is constituted by a codec, and said digital-to-analog converter is also constituted by said codec.

9. A method according to claim 7, wherein at least one transformation $T_i$ may be constituted by a digital filter enabling a transformed digital signal $y_i(n)$ to be obtained in application of the eauation:

$$y_i(n) = \sum_{k=0}^{k=n-1} a_{ik} \cdot y_i(n-k) + \sum_{k=0}^{k=n-1} b_{ik} \cdot x_i(n-k)$$

where i is an integer corresponding to a number of said input voice signal $x_i$, and n is an integer corresponding to the rank of a value of said digital signal $x_i(n)$ in said succession of discontinuous values, $a_{ik}$ and $b_{ik}$ being specific to each transformation $T_i$ and being defined so as to modify at least one of said characteristics of said voice of said remote party.

10. A method according to claim 7, wherein at least one transformation $T_i$ may be constituted by a digital filter of finite impulse response enabling a transformed digital signal $y_i(n)$ to be obtained in application of the equation:

$$y_i(n)=x_i(n)+\alpha \cdot x_i(n-K)$$

where α and K are defined so as to modify at least one of said characteristics of said voice of said remote party, K being an integer.

11. A method according to claim 7, wherein at least one transformation $T_i$ may be constituted by a digital filter of infinite impulse response enabling a transformed digital signal $y_i(n)$ to be obtained in application of the equation:

$$y_i(n)=x_i(n)+\alpha \cdot y_i(n-K)$$

where α and K are defined so as to modify at least one of said characteristics of said voice of said remote party, K being an integer.

12. A method according to claim 7, wherein at least one transformation $T_i$ may be constituted by a processor module serving to analyze at least one spectral component of said voice and to fabricate a synthetic voice on the basis of the result of that analysis and depending on the characteristics of a carrier signal associated with said processor module.

13. A communications system, comprising:
at least one receiver means suitable for receiving a plurality of input voice signals $X_i$, each input voice signal $x_i$ being received at a specific reception frequency $F_i$ and corresponding to a voice of a remote party in communication with a user of said communications system, the reception frequency of each input voice signal $x_i$ being distinct and independent of voice frequencies of the voice of the remote party corresponding to the input voice signal, i being an integer corresponding to a number of said input voice signal $x_i$;
at least one transmitter means;
at least one processor unit; and
at least one storage means storing transformations $T_i$ associated with the reception frequencies $F_i$ of said input voice signals, each transformation $T_i$ being associated with a respective one of the reception frequencies $F_i$ and being distinct from the other transformations in modifying voice characteristics;
said processor unit including calculation means executing instructions stored in said storage means to transform each input voice signal $x_i$ with the transformation $T_i$ associated with the reception frequency $F_i$ of the input voice signal $x_i$ so as to modify said voice characteristics of said voices of the remote parties corresponding to the input voice signals including modifying a sound volume of the voice of a first one of the remote parties and modifying the voice frequencies of the voice of a second one of the remote parties in order to optimize the perception of the discrimination between said voices of said remote parties by said user and thereby allow said user to concentrate on the voice of the remote party likely to deliver an important message.

14. A communications system according to claim 13, wherein said communications system includes at least one input means for inputting said reception frequencies $F_i$, for selecting said transformations $T_i$ from a list of transformations stored in said storage means, and for allocating each transformation $T_i$ to at least one reception frequency $F_i$, said frequencies $F_i$ and said associated transformations $T_i$ being stored in said storage means.

15. A system according to claim 13, wherein said communications system includes at least one adjustment means for adjusting said transformations $T_i$.

16. A system according to claim 13, wherein said communications system includes at least one analog-to-digital converter for converting said input voice signals $x_i$ into digital signals $x_i(n)$ made up of a succession of discontinuous values prior to applying said transformation $T_i$ thereto, thereby transforming them into a transformed digital signal $y_i(n)$, and at least one digital-to-analog converter for converting said digital signals $y_i(n)$ as transformed by said transformation $T_i$ into transformed analog voice signals $y_i$, n being an integer corresponding to the rank of a value of said digital signal $x_i(n)$ in said succession of discontinuous values.

* * * * *